(No Model.) 4 Sheets—Sheet 1.

E. THOMSON.
SYSTEM OF ELECTRIC DISTRIBUTION.

No. 335,159. Patented Feb. 2, 1886.

Witnesses:
Ernest Abshagen
Thos. Dorney

Inventor:
Elihu Thomson
By his Attorney:

(No Model.) 4 Sheets—Sheet 2.

E. THOMSON.
SYSTEM OF ELECTRIC DISTRIBUTION.

No. 335,159. Patented Feb. 2, 1886.

Witnesses:
Ernest Abshagen
Thos. Toomey

Inventor:
Elihu Thomson
By his Attorney: H. C. Townsend

N. PETERS. Photo-Lithographer, Washington, D. C.

(No Model.)  4 Sheets—Sheet 3.
E. THOMSON.
SYSTEM OF ELECTRIC DISTRIBUTION.
No. 335,159. Patented Feb. 2, 1886.
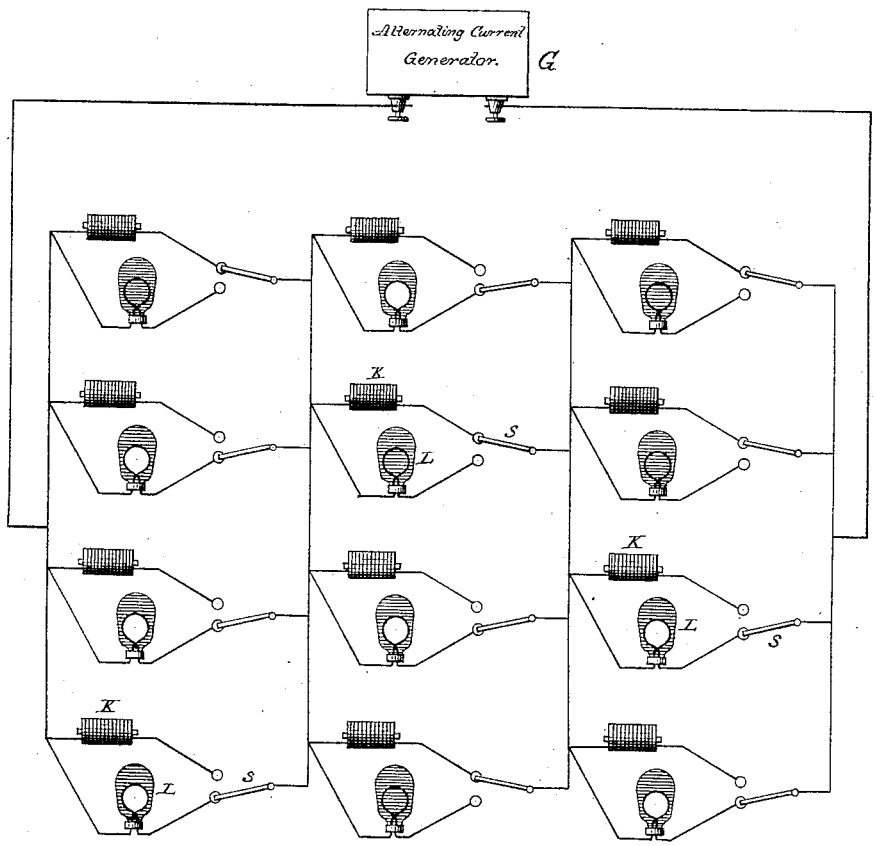
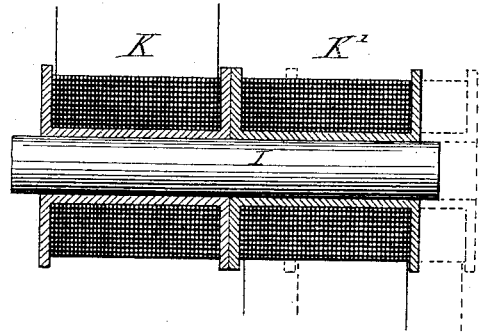
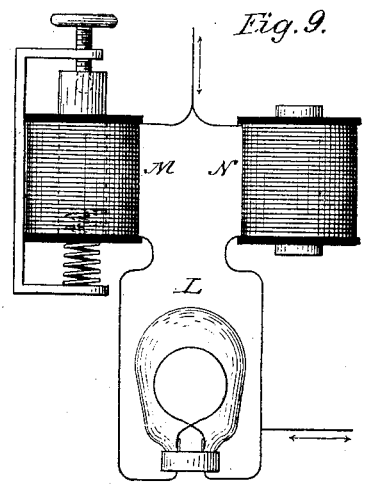
Witnesses: Ernest Abshagen, Thos. Toomey.
Inventor: Elihu Thomson
By his Attorney: W. C. Townsend (No Model.) 4 Sheets—Sheet 4.
E. THOMSON.
SYSTEM OF ELECTRIC DISTRIBUTION.
No. 335,159. Patented Feb. 2, 1886.
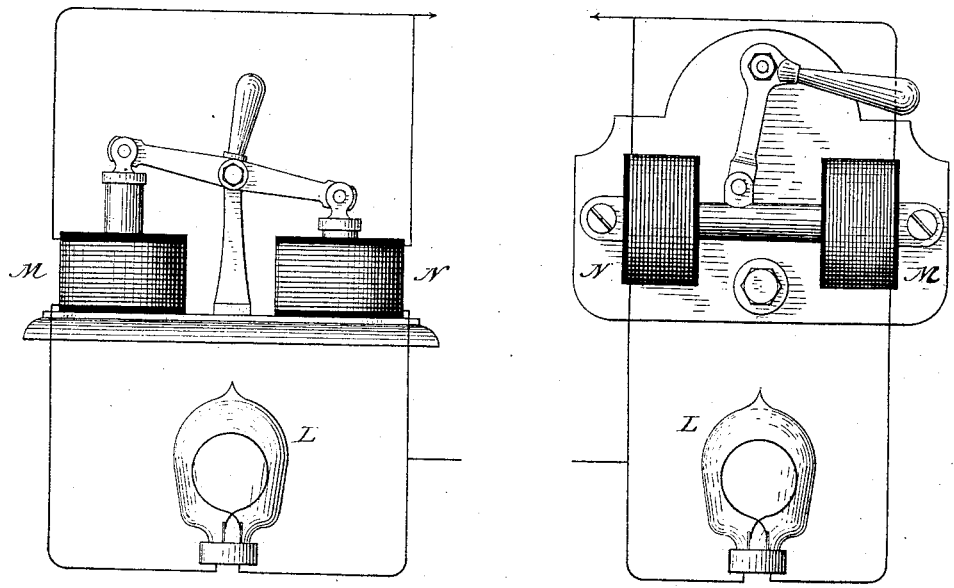
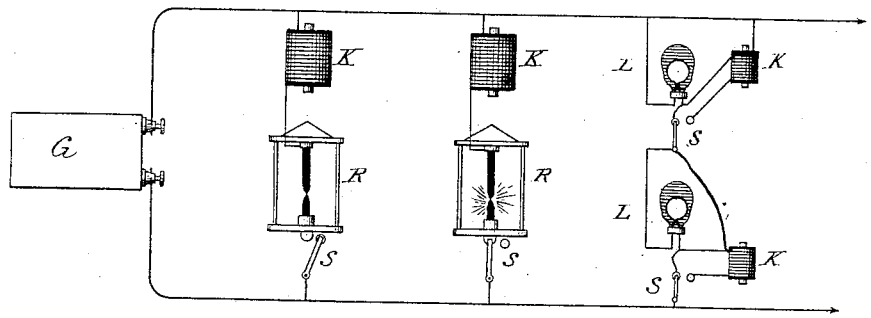
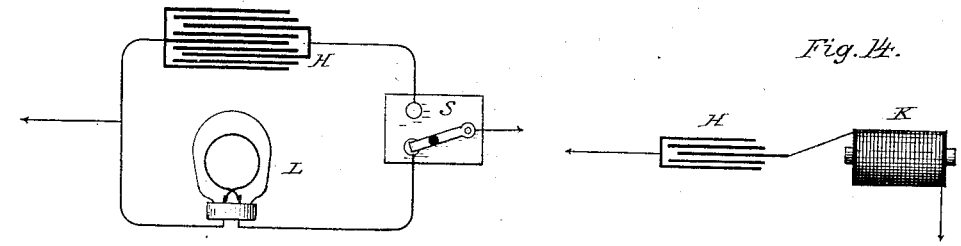
Witnesses:
Ernest Abshagen
Tho. Bonney
Inventor:
Elihu Thomson
By his Attorney: H. C. Townsend

UNITED STATES PATENT OFFICE.

ELIHU THOMSON, OF NEW BRITAIN, CONNECTICUT, ASSIGNOR TO THE THOMSON-HOUSTON ELECTRIC COMPANY, OF BOSTON, MASS.

SYSTEM OF ELECTRIC DISTRIBUTION.

SPECIFICATION forming part of Letters Patent No. 335,159, dated February 2, 1886.

Application filed March 19, 1883. Serial No. 88,741. (No model.)

*To all whom it may concern:*

Be it known that I, ELIHU THOMSON, a citizen of the United States, and a resident of New Britain, in the county of Hartford and State of Connecticut, have invented certain new and useful Systems of Electric Distribution, of which the following is a specification.

My invention relates to multiple-arc systems of electric distribution, and more especially to that system sometimes called the "series-multiple arc" system, in which the general circuit divides into a number of branches, each containing one or more lamps, motors, or other devices, reunites, again divides into another series or multiple-arc arrangement of branches, which again reunite, and so on through any desired number of branchings of the circuit. Hitherto no system of this character has been possible or practicable without substitution of equivalent resistances, or the like, when individual lamps or motors required to be extinguished or removed from operation, for the reason that where a number of branches of a current existed in series with other branches, it was necessary that any set of branches should, taken together, convey the whole current for other sets or series of branches, which is not possible, when extinctions or removals are made in a set of branches, without either increasing the light or work in the remaining lights, motors, or other apparatus on the same branched section, or substituting resistances for the lights put out.

My invention is designed to overcome the difficulty which would ordinarily arise from shunting a lamp or other apparatus through a branch of low resistance; and to this end it consists of certain novel combinations of alternate current-generators, reaction devices, &c., that will be specified in the claims.

I use in my system an alternating line-current supplied to the circuit by any suitable generator, or by an induction apparatus whose primary is fed by any suitable generator.

In the system herein described the line-current is divided into a multiple-arc series, or it divides through resistances, as a number of incandescent lamps, motors, or other apparatus in multiple arc, after which it continues through a second set of lights or other apparatus in series with the first, the number of which may be equal to those of the former or not, according to the relative currents desired to be fed to them. The second set may be followed by others according to the capacity of the generating source.

In connection with the lamps or other working resistances of the system, I provide a suitable electric reaction device—such, for instance, as an electro-magnetic reaction coil— consisting of a bundle of iron wire or other suitable divided or otherwise constructed core surrounded by a coil of insulated wire, and whose purpose is, when a lamp, motor, or other device is removed from circuit, to convey only that current that would have kept the lamp burning. The resistance of the "reactive coil" is made very small by preference, and it acts not as a substituted resistance, but as a real counter electro-motive-force generator. It contains a length of conducting-wire depending on the resistance of the lamps or other device, and which is less as the alternations of current in the line-circuit are more rapid. With alternations of eighty to one hundred per second a comparatively small coil is sufficient to represent a single ordinary lamp. They can, however, be used in a variety of ways to replace one or more lamps (or motors) of varying power.

This device operates after the well-known manner of an electro-magnet in an electric circuit to set up what is known as an "extra" or "counter" current, whose tendency is to oppose the current sent into the coils at the moment it begins to flow. Its operation in this respect, and for the purposes of my invention, must be decided and quick, and it must be capable of developing an impulse of counter electro-motive force of considerable energy and with a rapidity corresponding to the rapid alternations. The reactive device should also be of such character that its reactive effect shall increase with the current flowing to or through it. In these respects a secondary battery would not answer the purposes of my present invention, since its counter electro-motive energy depends primarily upon the number and character of its elements, and the rapid reversed impulses would be quite incapable of developing any considerable counter force in any ordinary battery.

In certain cases a condenser may replace the reactive coil in the systems.

I also provide novel means of regulating the passage of current to the lamps and of adjusting the reactive appliance thereto.

Figures 1, 2, and 3 represent applications of the reactive coil to incandescent lamps. Fig. 4 shows an automatic safety switching appliance combined with a reactive coil and an incandescent lamp. Fig. 5 is a modification or equivalent device. Fig. 6 shows a construction whereby the reactive power of the coil may be adjusted. Fig. 7 shows a series-multiple-arc system to which my invention is applied. Figs. 8, 9, 10, and 11 show modified arrangements of reactive coils designed for use in carrying out my invention. Fig. 12 illustrates the application of my invention to a multiple-arc system on which electric-arc lamps are run. Figs. 13 and 14 show another form of electro reactive device.

In Fig. 1, K is the reactive coil wound upon a bundle of iron wires or other divided core. L represents any incandescent lamp or working resistance whose amount does not greatly vary when in action. The terminals X Y are connected in a circuit leading from any source of alternating currents, and a suitable switch, S, is provided having contact-plates so as to throw either the coil K or the lamp L into circuit. These elements are grouped in a system of multiple-arc series, such as is shown in Fig. 7, and constitute the essential part of such a system of resistances.

Figure 4:
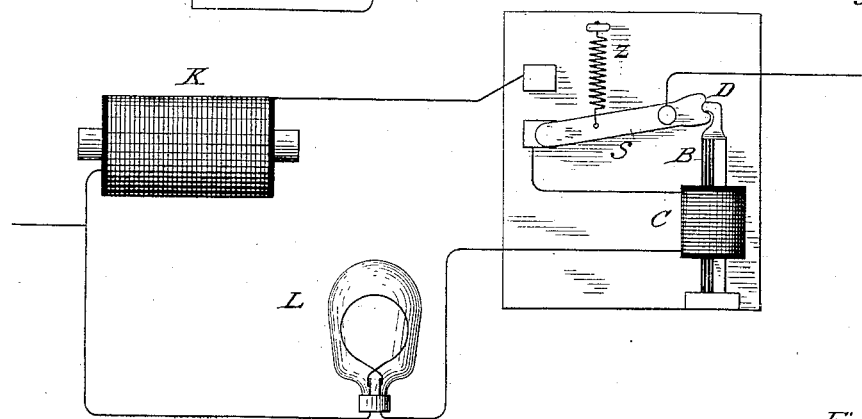

Fig. 4 shows the parts K and L, as before; but the switch S is arranged to be automatically shifted by a spring, so as to put the coil K in circuit when too much current flows through the lamp L, for which purpose a compound bar, B, governing a detent, D, is arranged to be actuated by heating of the coil C on abnormal current. The coil C is in the lamp-branch. The detent D is released by the flexing of the bar B on heating, and since said detent serves to hold the switch S when locked in the position shown, the switch S on release of D is transferred to K by the spring Z, thus saving the lamp L from injury.

Figure 5:
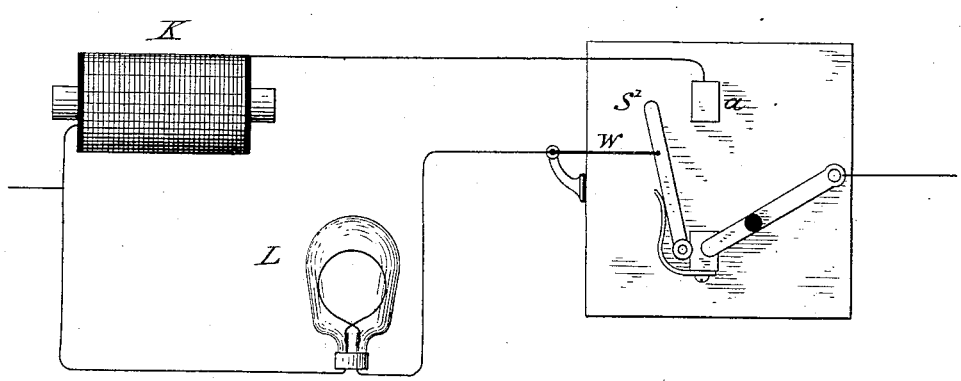

Fig. 5 shows a fusible wire, W, holding an auxiliary switch, S', open until the current through the lamp L becomes abnormal, when said wire W is fused and the switch S' closes upon the plate $a$, putting the coil K in circuit as before.

Figure 6:
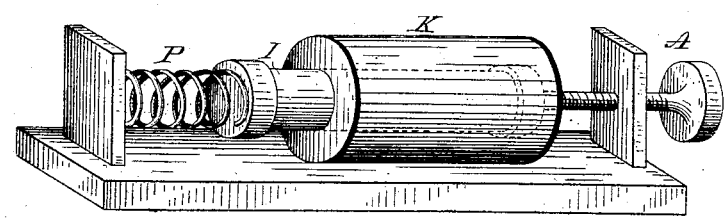

Fig. 6 shows one of many means that may be used for adjusting the reactive power of the coil K, and I do not limit myself to this device, but may change said power by any suitable or known means. The core I is made movable, and may be set in any position with respect to the coil K. When preferred, an adjusting device for setting said core is used. In the figure a spring, P, tends to force said core in one direction, while the adjusting-screw A moves it in the other. The coil may be made movable, or the core may be divided, and one or both parts moved; or the coil may be divided, or its length varied, &c., for the same effect. Its reactive effect is greatest when its core is centrally placed. Being made with an excess of effect in that position, it is, when used, adjusted to exactly replace a lamp—that is, it is set so as to be just able to transmit on the working-circuit a current of the same amount as that of the lamp it is to replace. This is easily determined by measurement with an electro-dynamo meter, or by trial in any way known to those skilled in the art.

Fig. 7 shows the circuit arrangements. G is a source of rapidly-alternating currents, the conductors from which are branched through a multiple-arc series of reactive coils and lamps within the capacity of the generator G. The letters K, L, and S represent coils, lamps, and switches, respectively. Different sizes of lights may be supplied in the same system by proportioning the branches in obedience to electric laws.

Fig. 8 shows a double reactive coil, adapted to supplant two lights separately, or a double-sized light, if the coils be used together. One coil, K', is made adjustable upon the core I.

In Fig. 9 a modified arrangement of circuit is shown where two reactive coils, M N, are used. One, M, is adjustable in power, as before described, and is placed in series with the lamp L, and it is used to vary the power of the light L by its effect upon the current traversing the same. When the core of M is inserted, but little current will on account of the reaction of M be able to pass through L, but the current will be transmitted by the coil N instead. When the core of M is withdrawn, the reactive effect of said coil is very small, and the current takes the path through M and L, leaving N with but small current.

Fig. 10 shows a device by which the action as just set forth is greatly enhanced. By its use the current may be virtually switched to and from the lamp L. The coils M and N have the same relations to the circuit as before, but the cores are differentially movable, as shown, so that as the effect in M is increased that on N is diminished, and vice versa. In the position shown the lamp is lighted, because the coil N whose core is in place does not permit the passage of much current through it, its reactive power being very great, but the core of M being withdrawn its power of resisting the alternations of current is very small, and, being in series with L, it allows current to pass thereto. When the positions of the cores are reversed, reverse effects ensue.

In Fig. 11 the construction is modified, so as to permit a single core to be used for both coils.

Fig. 12 shows how reactive coils may be used, in accordance with my invention, in a system in which alternating currents are used to work arc-lights in multiple arc. Ordinarily it is impracticable to work arc lights, properly speaking, except in series, for the reason that the resistance of an arc diminishes as the current is increased. Therefore the current is soon diverted to a single light; but by interposing a reactive coil, K, between the arc light R and the supply-mains in series with it the reaction of the coil K will not permit undue diversion of current to any single arc. The lights R R are extinguished by open-circuiting the branch by a switch, S, in said branch. The generator G should have an electro-motive energy in setting up the alternations in the main line adapted to the working condition of circuit.

Figure 1:
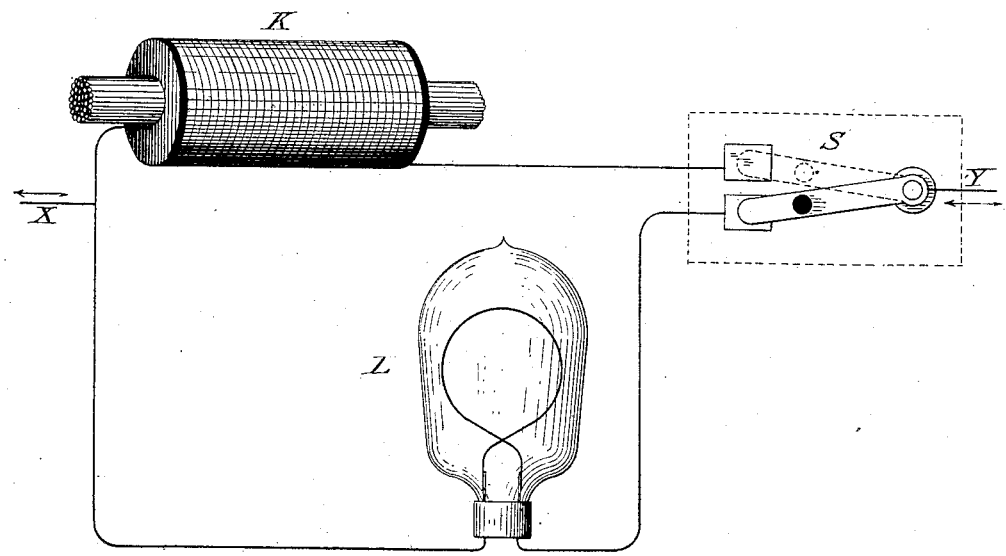
Figure 2:
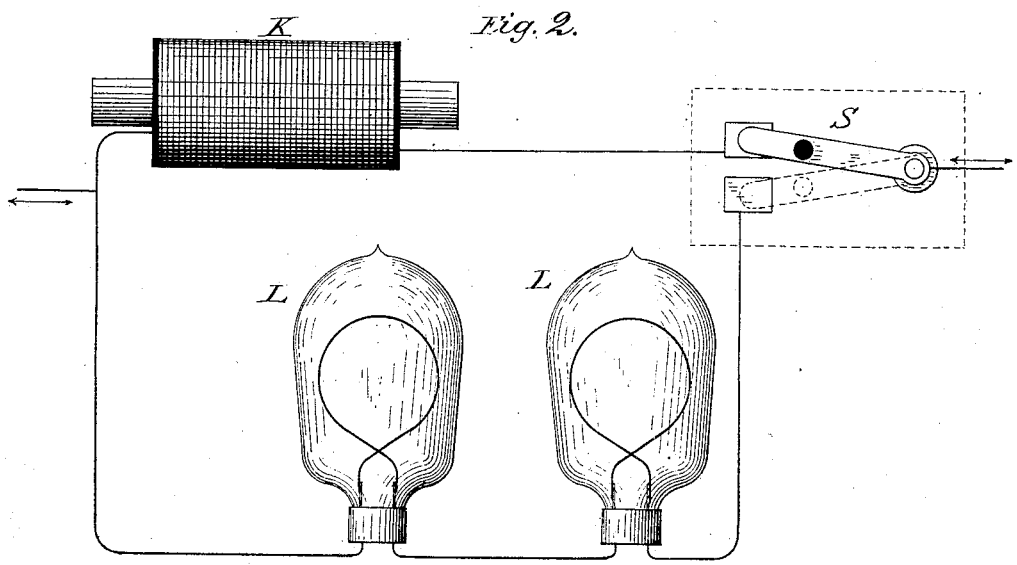
Fig. 2 shows the same parts as before; but there are two lamps, L L, placed in series and adapted to be replaced by the reactive coil K, as before.
Figure 3:
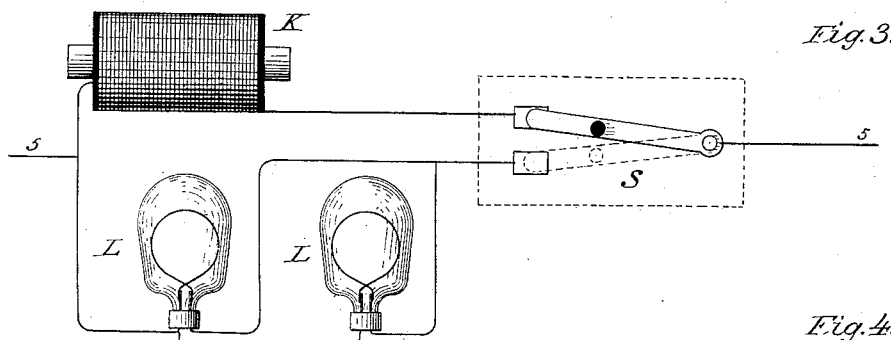
Fig. 3 shows the same parts, except that the lights L L are in multiple arc.

In Fig. 13 a condenser, H, is shown, replacing the coil K, Fig. 1. Its actions are similar if its surface be adjusted to allow it to be substituted for the lamp L, but it is more expensive to construct than a simple coil, and its power is not so easily varied. Its condensing power must be sufficient to allow it to transmit impulses of equal power to those that would ordinarily be used to supply a single lamp, L.

The objection of non-variability of the condenser is removed by using a condenser of variable capacity, or by combining with it a small reactive coil, K, adjustable, as herein described, and connected in series with it, as indicated in Fig. 14.

In the system as herein described, any lamp or lamps may be extinguished by simply replacing it by its reactive coil or condenser, or similar device, and without the loss of energy of current, such as occurs when the lamp has a resistance substituted therefor. The use of a multiple-arc series of lamps is thus rendered for the first time practicable, and it is well known that such a system presents advantages in distribution over a simple series or a simple multiple-arc system. The simple series demands either very high tension of current or very low resistance of lamps, and the multiple-arc system demands very high resistance of lamps and very heavy main conductors.

I have herein described a specific application of my invention consisting of the combination, with electric-arc lamps arranged in a multiple-arc system and applied with alternating currents, of reactive coils in circuit with said lamps, and open-circuiting switches for said lamps; but I do not make any detail claim thereto in this case, since this combination will be made the subject of a claim in a separate application for patent to be filed by me.

I am aware that it is not new to employ ordinary artificial resistances in branches around lamps, and therefore make no claim to such, my invention consisting, broadly, in the combination, with an alternating current-generator, of devices adapted to oppose effective counter electro-motive force, and arranged in the manner and for the purposes hereinbefore set forth.

What I claim as my invention is—

1. The combination, with an electric lamp or other translating device included in a circuit with a source of rapidly alternating or reversed currents, of an electro-magnetic self-inductive reaction device, or its described equivalent, normally out of action, and having a definite or determinate counter electro-motive capacity adapted or adjusted, as described, to permit it, when substituted for the lamp or other device, to oppose or check the passage of the alternating or reversed currents to a degree corresponding to the opposing effects arising from the electric resistance in the translating device.

2. The combination, with an incandescent electric lamp arranged in a multiple-arc branch from a main supplied with rapidly alternating or reversed currents, of an electro-magnetic self-inductive reaction device, or its described equivalent, normally out of action, and having a determinate or definite counter electro-motive tendency when exposed to the alternating currents, its capacity in such respect being adjusted or adapted, as set forth, to give to it when substituted for the lamp a checking or opposing influence corresponding to that due in the case of the incandescent lamp to the electric resistance of its filament and other parts in the electric circuit.

3. The combination, with an electric lamp or other translating device fed with alternating or reversed currents, of an electric reaction device normally out of action, and consisting of a coil and magnetic core adjusted or constructed in the proportions described, to give to said coil when thrown into action in place of the translating device a reactive tendency whose checking or opposing effect shall correspond to that due, in the case of the lamp or other apparatus, to the presence of electric resistance.

4. The combination, with an electric lamp or other working-resistance on an alternating or reversed current-circuit, of an adjustable reactive coil and core normally out of action and constructed in the manner or proportions stated, to permit it, when thrown into action in place of a lamp, to have a counter electromotive tendency the equivalent of a resistance equal to that of the lamp or other working-resistance.

5. The combination, with an incandescent electric lamp on an alternating or reversed current-circuit, of an electro reactive coil and core placed in a normally-open branch around the lamp, and having a determinate counter electro-motive capacity, whereby its opposing or checking influence on the alternating currents may be the equivalent of that due in the lamp to the presence of electric resistance, and an electric switch for switching out the lamp and switching in the reactive coil.

6. The combination, with the lamps or other working-resistances in a series multiple-arc system supplied with alternating currents, of an electro-magnetic reactive device, or its described equivalent, normally out of action and arranged and adjusted in the manner described to act as substitute for any lamp or lamps that may be removed from operation, and means for throwing said reactive device into action in the circuit when the resistance of the lamp or other device is removed from circuit.

7. The combination, with an electric lamp or other working-resistance, of an electro reactive device in a branch, and having a determinate counter electro-motive capacity, and adapted to be used as the equivalent of a substituted resistance, a similar electro-reactive device in circuit with said lamp, and means for varying the power of the latter device, as and for the purpose set forth.

8. The combination, upon an alternating current-circuit, of a working-resistance, the two reactive coils in separate branches of said circuit, the differentially-movable core or cores, and means for adjusting said cores so as to vary the flow of current by varying the reactive effects of the coils.

9. The combination, with a series multiple-arc system of electric lighting supplied by alternating currents, and with the lamps of said system, of reactive coils normally out of action, and constructed to have a capacity described, and means for substituting said coils for lamps, whereby they may by their reactive tendency act as substituted resistances equivalent to lamp-resistances.

10. The combination, with incandescent electric lamps arranged in multiple arc, of a branch around each lamp normally open and containing an equivalent of the lamp, a contact-closing switch normally open and controlling said branch, and electro-responsive devices connected with each multiple-arc wire and governing the action of the switch, in the manner described, to close the switch on an undue access of current to a lamp, all as set forth, whereby said lamp may be automatically and individually switched out of circuit without disturbing the normal flow of current to lamps in other multiple-arc wires or branches.

Signed at New Britain, in the county of Hartford and State of Connecticut, this 15th day of March, A. D. 1883.

ELIHU THOMSON.

Witnesses:
W. O. WAKEFIELD,
E. WILBUR RICE.